US012100355B2

(12) United States Patent
Keum et al.

(10) Patent No.: US 12,100,355 B2
(45) Date of Patent: Sep. 24, 2024

(54) GATE DRIVER AND DISPLAY APPARATUS INCLUDING SAME

(71) Applicant: Samsung Display Co., Ltd., Yongin-Si (KR)

(72) Inventors: Nackhyeon Keum, Yongin-si (KR); Kimyeong Eom, Yongin-si (KR); Kwangsae Lee, Yongin-si (KR)

(73) Assignee: Samsung Display Co., Ltd., Gyeonggi-Do Yongin-Si (KR)

( * ) Notice: Subject to any disclaimer, the term of this patent is extended or adjusted under 35 U.S.C. 154(b) by 0 days.

(21) Appl. No.: 18/217,924

(22) Filed: Jul. 3, 2023

(65) Prior Publication Data

US 2024/0071314 A1 Feb. 29, 2024

(30) Foreign Application Priority Data

Aug. 23, 2022 (KR) ........................ 10-2022-0105774

(51) Int. Cl.
*G09G 3/3266* (2016.01)

(52) U.S. Cl.
CPC ..... *G09G 3/3266* (2013.01); *G09G 2330/021* (2013.01)

(58) Field of Classification Search
CPC .................................................... G09G 3/3266
See application file for complete search history.

(56) References Cited

U.S. PATENT DOCUMENTS

| | | | | |
|---|---|---|---|---|
| 10,872,562 | B2 | 12/2020 | Na | |
| 11,195,469 | B2 * | 12/2021 | Kang | G09G 3/3233 |
| 2018/0330673 | A1 * | 11/2018 | Kang | G09G 3/3266 |
| 2020/0074952 | A1 * | 3/2020 | Tominaga | G09G 3/3677 |
| 2020/0175913 | A1 * | 6/2020 | Kang | G09G 3/32 |
| 2021/0407381 | A1 * | 12/2021 | Park | G09G 3/32 |

FOREIGN PATENT DOCUMENTS

| | | | |
|---|---|---|---|
| KR | 10-0590249 | B1 | 6/2006 |
| KR | 10-2006-0076991 | A | 7/2006 |
| KR | 10-1244660 | B1 | 3/2013 |
| KR | 10-2019-0100550 | A | 8/2019 |
| KR | 10-2020-0083759 | A | 7/2020 |

* cited by examiner

*Primary Examiner* — Sepehr Azari
(74) *Attorney, Agent, or Firm* — Innovation Counsel LLP

(57) ABSTRACT

Provided is a gate driver including a plurality of stages, wherein each stage includes an output unit including a pull-up transistor and a pull-down transistor, and a second node controller configured to control a voltage of a second control node to which a gate of the pull-up transistor is connected, wherein the second node controller includes a first control transistor connected between the first clock terminal and the second control node and including a gate connected to the first control node, and a second control transistor including a gate connected to the gate of the first control transistor and configured to control a short circuit between the first clock terminal and a second clock terminal.

20 Claims, 9 Drawing Sheets

GATE DRIVER AND DISPLAY APPARATUS INCLUDING SAME

CROSS-REFERENCE TO RELATED APPLICATION

This application is based on and claims priority under 35 U.S.C. § 119 to Korean Patent Application No. 10-2022-0105774, filed on Aug. 23, 2022, in the Korean Intellectual Property Office, the disclosure of which is incorporated by reference herein in its entirety.

BACKGROUND

1. Field

One or more embodiments relate to a gate driver and a display apparatus including the same.

2. Description of the Related Art

A display apparatus includes a pixel portion, a gate driver, a data driver, and a controller, the pixel portion including a plurality of pixels. The gate driver includes stages connected to gate lines, and the stages are configured to supply gate signals to the gate lines connected to the stages in response to signals from the controller.

SUMMARY

One or more embodiments include a gate driver configured to stably output gate signals and a display apparatus including the gate driver. Technical objects to be achieved by an embodiment are not limited to the technical objects mentioned above, and other technical objects that are not mentioned will be clearly understood by those of ordinary skill in the art from the description of the disclosure.

Additional aspects will be set forth in part in the description which follows and, in part, will be apparent from the description, or may be learned by practice of the presented embodiments of the disclosure.

According to one or more embodiments, a gate driver includes a plurality of stages, wherein each of the plurality of stages includes an output unit including a pull-up transistor and a pull-down transistor, the pull-up transistor being connected between a first clock terminal and an output terminal, and the pull-down transistor being connected between the output terminal and a voltage input terminal, a first node controller configured to control a voltage level of a first control node to which a gate of the pull-down transistor is connected, and a second node controller configured to control a voltage level of a second control node to which a gate of the pull-up transistor is connected, wherein the second node controller includes a first control transistor connected between the first clock terminal and the second control node and including a gate connected to the first control node, and a second control transistor including a gate connected to the gate of the first control transistor and configured to control a short circuit between the first clock terminal and a second clock terminal.

The first node controller may include a first transistor connected between a first node and an input terminal to which a start signal is applied, the first transistor including a gate connected to the first clock terminal, and a second transistor connected between the first node and the first control node and including a gate connected to the voltage input terminal.

The first node controller may further include a third transistor connected between a second node and the second clock terminal and including a gate connected to the first control node, and a first capacitor connected between the first control node and the second node.

The start signal may be an output signal output from an output terminal of a previous stage.

A first clock signal applied to the first clock terminal and a second clock signal applied to the second clock terminal may have a phase difference.

The second node controller may further include a fourth transistor connected between a third node and the voltage input terminal and including a gate connected to the first clock terminal, a fifth transistor connected between the third node and a fourth node and including a gate connected to the voltage input terminal, a sixth transistor connected between a fifth node and the second clock terminal and including a gate connected to the fourth node, and a seventh transistor connected between the fifth node and the second control node and including a gate connected to the second clock terminal, wherein the second control transistor may be connected between the first clock terminal and the third node.

The second node controller may further include a second capacitor connected between the first clock terminal and the second control node, and a third capacitor connected between the fourth node and the fifth node.

The second node controller may further include a ninth transistor connected between the sixth transistor and the second clock terminal and including a gate connected to the fourth node.

The second node controller may further include a fourth transistor connected between a third node and the first clock terminal and including a gate connected to the first clock terminal, a fifth transistor connected between the third node and a fourth node and including a gate connected to the voltage input terminal, a sixth transistor connected between a fifth node and the second clock terminal and including a gate connected to the fourth node, and a seventh transistor connected between the fifth node and the second control node and including a gate connected to the second clock terminal, wherein the second control transistor may be connected between the first clock terminal and the third node.

The second node controller may further include a ninth transistor connected between the sixth transistor and the second clock terminal and including a gate connected to the fourth node.

Four clock signals having a phase difference may be sequentially applied to the gate driver, two clock signals among the four clock signals may be supplied to each of the plurality of stages, and an input pair of the four clock signals may be repeated every four stages.

According to one or more embodiments, a display apparatus includes a pixel portion in which a plurality of pixel are arranged, and a gate driver configured to output gate signals to the plurality of pixels, wherein the gate driver includes a plurality of stages, and each of the plurality of stages includes an output unit including a pull-up transistor and a pull-down transistor, the pull-up transistor being connected between a first clock terminal and an output terminal configure to output the gate signal, and the pull-down transistor being connected between the output terminal and a voltage input terminal, a first node controller configured to control a voltage level of a first control node to which a gate of the pull-down transistor is connected, and a second node controller configured to control a voltage level of a second control node to which a gate of the pull-up transistor is connected, wherein the second node controller includes a first control transistor connected between the first clock terminal and the second control node and including a gate connected to the first control node, and a second control transistor including a gate connected to the gate of the first control transistor and configured to control a short circuit between the first clock terminal and a second clock terminal.

The first node controller may include a first transistor connected between an input terminal to which a start signal is applied and a first node, the first transistor including a gate connected to the first clock terminal, a second transistor connected between the first node and the first control node and including a gate connected to the voltage input terminal, a third transistor connected between a second node and the second clock terminal and including a gate connected to the first control node, and a first capacitor connected between the first control node and the second node.

The start signal may be an output signal output from an output terminal of a previous stage.

A first clock signal applied to the first clock terminal and a second clock signal applied to the second clock terminal may have a phase difference.

The second node controller may further include a fourth transistor connected between a third node and the voltage input terminal and including a gate connected to the first clock terminal, a fifth transistor connected between the third node and a fourth node and including a gate connected to the voltage input terminal, a sixth transistor connected between a fifth node and a second clock terminal and including a gate connected to the fourth node, a seventh transistor connected between the fifth node and the second control node and including a gate connected to the second clock terminal, a second capacitor connected between the first clock terminal and the second control node, and a third capacitor connected between the fourth node and the fifth node, wherein the second control transistor may be connected between the first clock terminal and the third node.

The second node controller may further include a ninth transistor connected between the sixth transistor and the second clock terminal and including a gate connected to the fourth node.

The second node controller may further include a fourth transistor connected between a third node and the first clock terminal and including a gate connected to the first clock terminal, a fifth transistor connected between the third node and a fourth node and including a gate connected to the voltage input terminal, a sixth transistor connected between a fifth node and the second clock terminal and including a gate connected to the fourth node, a seventh transistor connected between the fifth node and the second control node and including a gate connected to the second clock terminal, and a third capacitor connected between the fourth node and the fifth node, wherein the second control transistor may be connected between the first clock terminal and the third node.

The second node controller may further include a ninth transistor connected between the sixth transistor and the second clock terminal and including a gate connected to the fourth node.

Four clock signals having a phase difference may be sequentially supplied to the gate driver, two clock signals among the four clock signals may be supplied to each of the plurality of stages, and an input pair of the four clock signals may be repeated every four stages.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
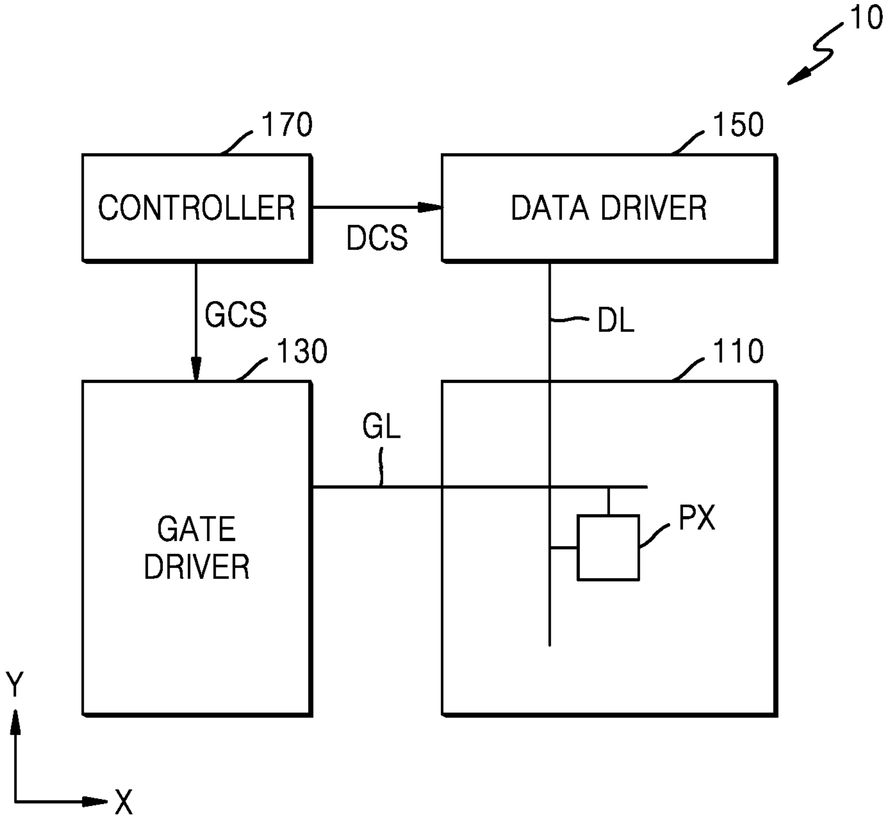
FIG. 1 is a schematic plan view of a display apparatus according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Throughout the disclosure, the expression "at least one of a, b or c" indicates only a, only b, only c, both a and b, both a and c, both b and c, all of a, b, and c, or variations thereof.

As the present disclosure allows for various changes and numerous embodiments, certain embodiments will be illustrated in the drawings and described in the written description. Effects and features of the disclosure, and methods for achieving them will be clarified with reference to embodiments described below in detail with reference to the drawings. However, the disclosure is not limited to the following embodiments and may be embodied in various forms.

While such terms as "first" and "second" may be used to describe various elements, such elements must not be limited to the above terms. The above terms are used to distinguish one element from another.

The singular forms "a," "an," and "the" as used herein are intended to include the plural forms as well unless the context clearly indicates otherwise.

It will be understood that the terms "comprise," "comprising," "include" and/or "including" as used herein specify the presence of stated features or elements but do not preclude the addition of one or more other features or elements.

It will be further understood that, when a layer, region, or element is referred to as being "on" another layer, region, or element, it can be directly or indirectly on the other layer, region, or element. That is, for example, intervening layers, regions, or elements may be present.

Sizes of elements in the drawings may be exaggerated or reduced for convenience of explanation. As an example, the size and thickness of each element shown in the drawings are arbitrarily represented for convenience of description, and thus, the present disclosure is not necessarily limited thereto.

In the present specification, "A and/or B" means A or B, or A and B. In the present specification, "at least one of A and B" means A or B, or A and B.

In embodiments below, when it is described that X is connected to Y, X may be electrically connected to Y, X may be functionally connected to Y, or X may be directly connected to Y. Here, X and Y may be objects (e.g., apparatuses, elements, circuits, wirings, electrodes, terminals, conductive layers, layers, and the like). Accordingly, X and Y are not limited to preset connection relationships and connection relationships shown and made in the drawings and the detailed description, but may include connection relationships other than the connection relationships shown and made in the drawings and the detailed description.

The case where X is electrically connected to Y may include the case where at least one element (e.g., a switch, a transistor, a capacitance element, an inductor, a resistance element, a diode, and the like) enabling electrical connection between X and Y is connected between X and Y.

In embodiments below, "ON" used in association with an element state may denote an active state of an element, and "OFF" may denote an inactive state of an element. "ON" used in association with a signal received by an element may denote a signal activating the element, and "OFF" may denote a signal inactivating the element. An element may be activated by a high-level voltage or a low-level voltage. As an example, a P-type transistor may be activated by a low-level voltage, and an N-type transistor may be activated by a high-level voltage. Accordingly, it should be understood that "ON" voltages for a P-type transistor and an N-type transistor are opposite (low vs. high) voltage levels. Hereinafter, a voltage and a voltage level activating a transistor are referred to as an ON voltage and an ON voltage level, and a voltage and a voltage level inactivating a transistor are referred to as an OFF voltage and an OFF voltage level.

FIG. 1 is a schematic plan view of a display apparatus 10 according to an embodiment.

The display apparatus 10 according to embodiments may be implemented as electronic apparatuses such as smartphones, mobile phones, smartwatches, navigation apparatuses, game consoles, televisions (TVs), head units for automobiles, notebook computers, laptop computers, tablet computers, personal multimedia players (PMPs), personal digital assistants (PDAs), and the like. In addition, an electronic apparatus may be a flexible apparatus.

Referring to FIG. 1, the display apparatus 10 according to an embodiment may include a pixel portion 110, a gate driver 130, a data driver 150, and a controller 170. In an embodiment, the display apparatus 10 may include a display panel including a substrate, and the pixel portion 110 and the gate driver 130 disposed on the substrate. A circuit board including the data driver 150 and the controller 170 may be electrically connected to the display panel.

A plurality of pixels PX and signal lines that may be configured to apply electrical signals to the plurality of pixels PX may be arranged in the pixel portion 110.

The plurality of pixels PX may be repeatedly arranged in a first direction (an x direction, a row direction) and a second direction (a y direction, a column direction). The plurality of pixels PX may be arranged in various configurations such as a stripe configuration, a PenTile® configuration, a mosaic configuration, and the like to display images. Each of the plurality of pixels PX may include an organic light-emitting diode as a display element. The organic light-emitting diode may be connected to the pixel circuit. The pixel circuit may include a plurality of transistors and at least one capacitor.

Signal lines configured to apply electrical signals to the plurality of pixels PX may include a plurality of gate lines GL and a plurality of data lines DL, wherein the plurality of gate lines GL extend in the first direction, and the plurality of data lines DL extend in the second direction. The plurality of gate lines GL may be disposed to be spaced apart from each other in the second direction and configured to transfer gate signals to the pixels PX. The plurality of data lines DL may be disposed to be spaced apart from each other in the first direction and configured to transfer data signals to the pixels PX. Each of the plurality of pixels PX may be connected to at least one corresponding gate line among the plurality of gate lines GL and at least one corresponding data line among the plurality of data lines DL. In an embodiment, at least one gate line GL connected to each pixel PX may include at least one of a first gate control line GCL1, a second gate control line GCL2, a third gate control line GCL3, a fourth gate control line GCL4, and a fifth gate control line GCL5 shown in FIG. 2.

The gate driver 130 may be connected to the plurality of gate lines GL, configured to generate gate signals in response to control signals GCS received from the controller 170, and sequentially supply the gate signals to the gate lines GL. The gate line GL may be connected to a gate of a transistor included in the pixel PX. A gate signal may be a square wave signal including an on-voltage (an on-voltage level) which turns on a transistor connected to the gate line GL and an off-voltage (an off-voltage level) which turns off the transistor connected to the gate line GL. The on-voltage and the off-voltage are alternatingly and repeatedly disposed in the square wave signal. In an embodiment, an on-voltage may be a high-level voltage (referred to as a 'high voltage', hereinafter), or a low-level voltage (referred to as a 'low voltage', hereinafter). A period in which an on-voltage of a gate signal is maintained (referred to as an 'on-voltage period', hereinafter), and a period in which an off-voltage of a gate signal is maintained (referred to as an 'off-voltage period', hereinafter) may be determined according to the function of a transistor configured to receive a gate signal in the pixel PX. The gate driver 130 may include a shift register (or a stage) configured to sequentially generate and output gate signals.

The data driver 150 may be connected to the plurality of data lines DL and configured to supply data signals to the data lines DL in response to control signals DCS from the controller 170. The data signals supplied to the data lines DL may be supplied to the pixels PX to which gate signals are supplied. For this purpose, the data driver 150 may be configured to supply data signals to the data lines DL in synchronization with the gate signals.

In the case where the display apparatus is an organic light-emitting display apparatus, a first power voltage ELVDD and a second power voltage ELVSS may be supplied to the pixels PX of the pixel portion 110. The first power voltage ELVDD may be a high voltage provided to a first electrode (a pixel electrode or an anode) of an organic light-emitting diode included in each pixel PX. The second power voltage ELVSS may be a low voltage provided to a second electrode (an opposite electrode or a cathode) of an organic light-emitting diode. The first power voltage ELVDD and the second power voltage ELVSS are driving voltages configured to allow the plurality of pixels PX to emit light.

The controller 170 may be configured to generate control signals GCS and DCS based on signals input from the outside. The controller 170 may be configured to supply control signals GCS to the gate driver 130 and supply control signals DCS to the data driver 150.

In an embodiment, the plurality of transistors included in the pixel circuit may be N-type oxide thin-film transistors. An active pattern (a semiconductor layer) of an oxide thin-film transistor may include an oxide.

In an embodiment, some of the plurality of transistors included in the pixel circuit may be N-type oxide thin-film transistors, and others may be P-type silicon thin-film transistors. An active pattern (a semiconductor layer) of a silicon thin-film transistor may include amorphous silicon, polycrystalline silicon, or the like.

Figure 2:
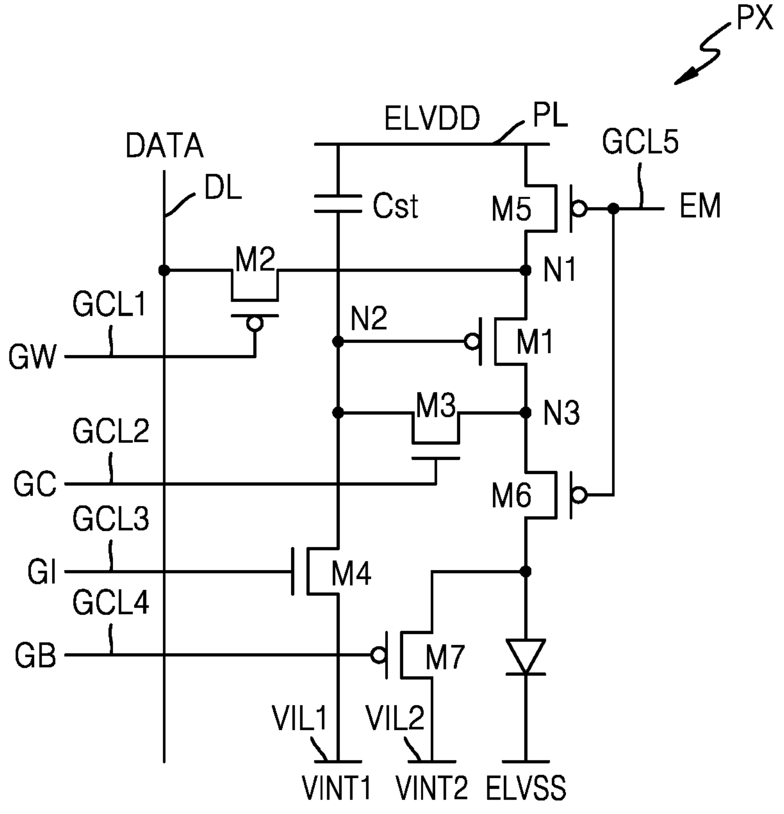
FIG. 2 is an equivalent circuit diagram of a pixel according to an embodiment.

FIG. 2 is an equivalent circuit diagram of a pixel according to an embodiment.

Referring to FIG. 2, the pixel PX includes a pixel circuit and an organic light-emitting diode OLED connected to the pixel circuit as a display element. The pixel circuit includes a plurality of first to seventh transistors M1, M2, M3, M4, M5, M6, and M7, a capacitor Cst, and signal lines, first and second initialization voltage lines VIL1 and VIL2, and a driving voltage line PL, connected thereto. The signal lines may include the data line DL, the first gate control line GCL1, the second gate control line GCL2, the third gate control line GCL3, the fourth gate control line GCL4, and the fifth gate control line GCL5. The first gate control line GCL1, the second gate control line GCL2, the third gate control line GCL3, the fourth gate control line GCL4, and the fifth gate control line GCL5 may be examples of the gate line GL shown in FIG. 1.

The first transistor M1 may be a driving transistor, and the second to seventh transistors M2, M3, M4, M5, M6, and M7 may be switching transistors. Depending on the kind (P-type or N-type) and/or operation condition of a transistor, a first terminal of each of the first to seventh transistors M1, M2, M3, M4, M5, M6, and M7 may be a source terminal or a drain terminal, and a second terminal may be a terminal different from the first terminal. As an example, in the case where the first terminal is a source terminal, the second terminal may be a drain terminal. In an embodiment, the source terminal and the drain terminal may be referred to as a source electrode and a drain electrode interchangeably, respectively.

The driving voltage line PL may be configured to transfer the first power voltage ELVDD to the first transistor M1. The first power voltage ELVDD may be a high voltage provided to a first electrode (a pixel electrode or an anode) of an organic light-emitting diode included in each pixel PX. The first initialization voltage line VIL1 may be configured to transfer a first initialization voltage VINT1 to the pixel PX, wherein the first initialization voltage VINT1 initializes the first transistor M1. The second initialization voltage line VIL2 may be configured to transfer a second initialization voltage VINT2 to the pixel PX, wherein the second initialization voltage VINT2 initializes the organic light-emitting diode OLED.

In FIG. 2, among the first to seventh transistors M1, M2, M3, M4, M5, M6, and M7, the third transistor M3 and the fourth transistor M4 may be implemented as n-channel metal-oxide semiconductor (NMOS) field-effect transistors (N-channel MOSFETs), and the rest may be implemented as p-channel metal-oxide semiconductor (PMOS) field-effect transistors (P-channel MOSFETs).

The first transistor M1 may be connected between the driving voltage line PL and the organic light-emitting diode OLED. The first transistor M1 may be connected to the driving voltage line PL through the fifth transistor M5, and electrically connected to the organic light-emitting diode OLED through the sixth transistor M6. The first transistor M1 includes a gate, a first terminal, and a second terminal, wherein the gate is connected to a second node N2, the first terminal is connected to a first node N1, and the second terminal is connected to a third node N3. The first transistor M1 may be configured to receive a data signal according to a switching operation of the second transistor M2 and supply a driving current to the organic light-emitting diode OLED.

The second transistor M2 (a data-write transistor) may be connected between the data line DL and the first node N1 and connected to the driving voltage line PL through the fifth transistor M5. The first node N1 may be a node to which the first transistor M1 and the fifth transistor M5 are connected. The second transistor M2 includes a gate, a first terminal, and a second terminal, wherein the gate is connected to the first gate control line GCL1, the first terminal is connected to the data line DL, and the second terminal is connected to the first node N1 (or the first terminal of the first transistor M1). The second transistor M2 may be turned on in response to a first gate signal GW transferred through the first gate control line GCL1 and configured to transfer a data signal which is received from the data line DL to the first node N1.

The third transistor M3 (a compensation transistor) may be connected between the second node N2 and the third node N3. The third transistor M3 may be connected to the organic light-emitting diode OLED through the sixth transistor M6. The second node N2 may be a node to which a gate of the first transistor M1 is connected, and the third node N3 may be a node to which the first transistor M1 and the sixth transistor M6 are connected. The third transistor M3 includes a gate, a first terminal, and a second terminal, wherein the gate is connected to the second gate control line GCL2, the first terminal is connected to the second node N2 (or the gate of the first transistor M1), and the second terminal is connected to the third node N3 (or the second terminal of the first transistor M1). The third transistor M3 may be turned on in response to a second gate signal GC which is received from the second gate control line GCL2 and may be configured to compensate for a threshold voltage of the first transistor M1 by diode-connecting the first transistor M1.

The fourth transistor M4 (a first initialization transistor) may be connected between the second node N2 and the first initialization voltage line VIL1. The fourth transistor M4 includes a gate, a first terminal, and a second terminal, wherein the gate is connected to the third gate control line GCL3, the first terminal is connected to the second node N2, and the second terminal is connected to the first initialization voltage line VIL1. The fourth transistor M4 may be turned on in response to a third gate signal GI which is received from the third gate control line GCL3 to initialize the gate of the first transistor M1 by transferring the first initialization voltage VINT1 to the gate of the first transistor M1.

The fifth transistor M5 (a first emission control transistor) may be connected between the driving voltage line PL and the first node N1. The sixth transistor M6 (a second emission control transistor) may be connected between the third node N3 and the organic light-emitting diode OLED. The fifth transistor M5 may include a gate, a first terminal, and a second terminal, wherein the gate is connected to the fifth gate control line GCL5, the first terminal is connected to the driving voltage line PL, and the second terminal is connected to the first node N1. The sixth transistor M6 may include a gate, a first terminal, and a second terminal, wherein the gate is connected to the fifth gate control line GCL5, the first terminal is connected to the third node N3, and the second terminal is connected to the pixel electrode of the organic light-emitting diode OLED. The fifth transistor M5 and the sixth transistor M6 are simultaneously turned on in response to a fifth gate signal EM which is received from the fifth gate control line GCL5, and the driving current flows through the organic light-emitting diode OLED.

The seventh transistor M7 (a second initialization transistor) may be connected between the organic light-emitting diode OLED and the second initialization voltage line VIL2. The seventh transistor M7 may include a gate, a first terminal, and a second terminal, wherein the gate is connected to the fourth gate control line GCL4, the first terminal is connected to the second terminal of the sixth transistor M6 and the pixel electrode of the organic light-emitting diode OLED, and the second terminal is connected to the second initialization voltage line VIL2. The seventh transistor M7 may be turned on in response to a fourth gate signal GB which is received from the fourth gate control line GCL4 to initialize the organic light-emitting diode OLED by transferring the second initialization voltage VINT2 to the pixel electrode of the organic light-emitting diode OLED.

The capacitor Cst may include a first electrode and a second electrode. The first electrode may be connected to the gate of the first transistor M1, and the second electrode may be connected to the driving voltage line PL. The capacitor Cst may maintain a voltage applied to the gate electrode of the first transistor M1 by storing and maintaining a voltage corresponding to a difference between voltages of the gate of the first transistor M1 and the driving voltage line PL.

The organic light-emitting diode OLED may include the pixel electrode and the opposite electrode, and the opposite electrode may be configured to receive the second power voltage ELVSS. The second power voltage ELVSS may be a low voltage provided to the second electrode (the opposite electrode or the cathode) of the organic light-emitting diode OLED. The organic light-emitting diode OLED may be configured to display images according to a driving current supplied from the first transistor M1 and emitting light. The first power voltage ELVDD and the second power voltage ELVSS are driving voltages configured to allow the plurality of pixels PX to emit light.

The pixel PX may include a non-emission period and an emission period during one frame period. A frame period may be a period during which one-frame image is displayed. The non-emission period may include an initialization period in which the fourth transistor M4 is turned on to initialize the gate of the first transistor M1, a data-write period in which the second transistor M2 is turned on and a data signal is supplied to a pixel, a compensation period in which the third transistor M3 is turned on and a threshold voltage of the first transistor M1 is compensated, and a reset period in which the seventh transistor M7 is turned on to initialize the organic light-emitting diode OLED. The emission period may be a period in which the fifth transistor M5 and the sixth transistor M6 are turned on and the organic light-emitting diode OLED is configured to emit light. The emission period may be longer than each of the initialization period, the data-write period, the compensation period, and the reset period of the non-emission period.

In the present embodiment, at least one of the plurality of transistors (thin-film transistors) M1, M2, M3, M4, M5, M6, and M7 includes a semiconductor layer including an oxide, and the rest include a semiconductor layer including silicon. Specifically, the first transistor (the driving transistor) directly influencing the brightness of the display apparatus may include a semiconductor layer including polycrystalline silicon having high reliability, and thus, a high-resolution display apparatus may be implemented through this configuration.

Because an oxide semiconductor has high carrier mobility and a low leakage current, a voltage drop is not large even when a driving time is long. That is, because a color change of an image according to a voltage drop is not large even while the display apparatus is driven at low frequencies, the display apparatus may be driven at low frequencies without a significant voltage drop. Because an oxide semiconductor has an advantage of a low leakage current as described above, an oxide semiconductor is employed as the semiconductor layer of at least one of the third transistor M3 and the fourth transistor M4 connected to the gate of the first transistor M1, a leakage current from the gate of the first transistor M1 through the third transistor M3 and the fourth transistor M4 may be prevented, and, thus, power consumption of the display panel may be reduced.

Figure 3:
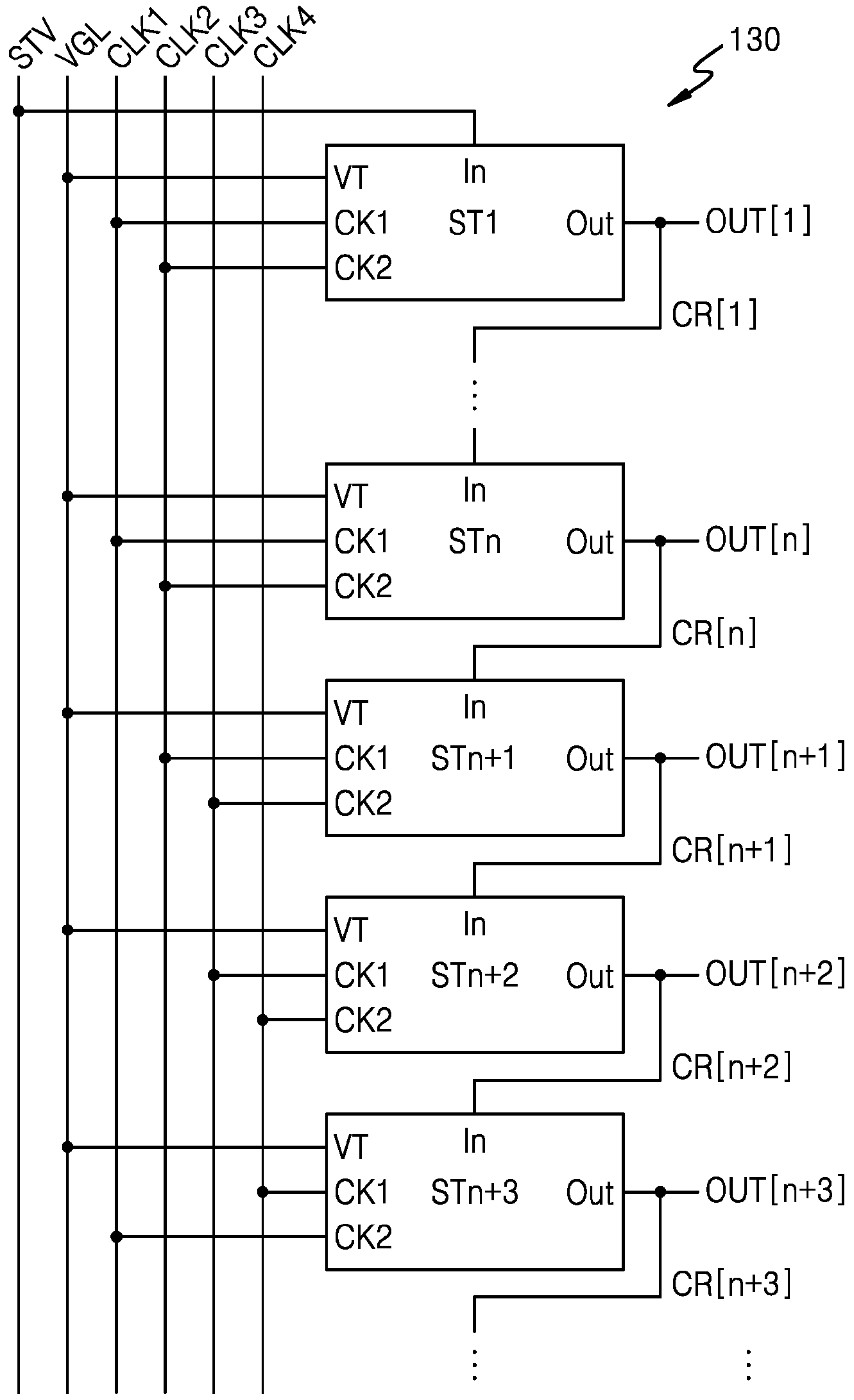
FIG. 3 is a schematic view of a gate driver according to an embodiment.
Figure 4:
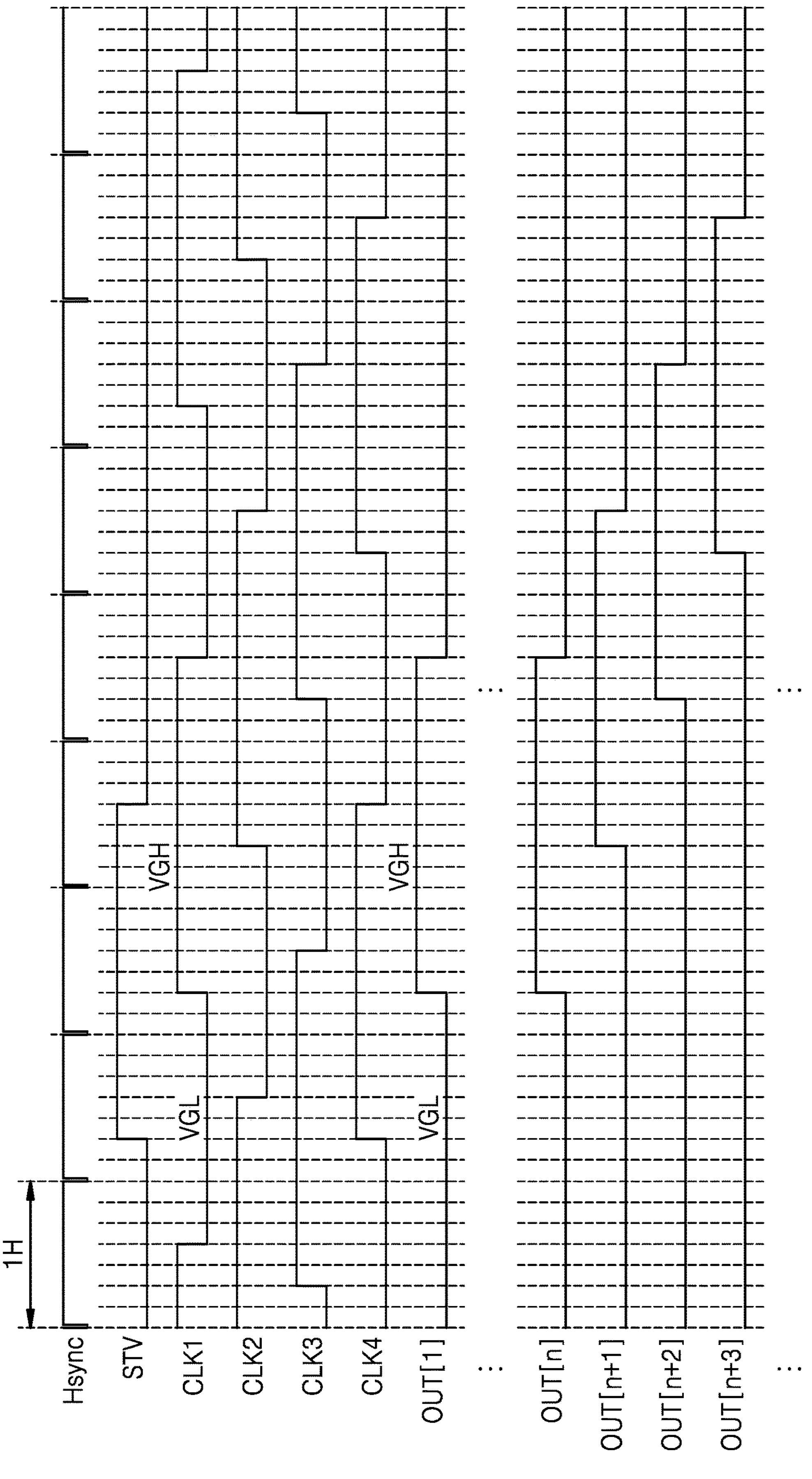
FIG. 4 is a timing diagram showing input/output signals of the gate driver of FIG. 3.

FIG. 3 is a schematic view of a gate driver according to an embodiment. FIG. 4 is a timing diagram showing input/output signals of the gate driver 130.

Referring to FIG. 3, the gate driver 130 may include a plurality of stages ST (ST1, ST2, . . . , STn+3). The number of stages ST provided to the gate driver 130 may be variously modified depending on the number of pixel rows provided to the pixel portion 110. Referring to FIG. 4, an external signal STV as a start signal, first to fourth clock signals CLK1, CLK2, CLK3, and CLK4, and an output signal OUT are shown. A horizontal synchronization signal Hsync is shown as a reference signal for timing. An interval between pulses of a horizontal synchronization signal Hsync may be a 1-horizontal period 1H.

The first to fourth clock signals CLK1, CLK2, CLK3, and CLK4 may be sequentially supplied with a phase difference to the gate driver 130. Two clock signals among the first to fourth clock signals CLK1, CLK2, CLK3, and CLK4 may be supplied to each stage ST, and input pairs of the first to fourth clock signals CLK1, CLK2, CLK3, and CLK4 may be repeated in units of four stages. Because four clock signals are repeated in units of four stages ST in the gate driver 130 according to an embodiment, power consumption may be reduced compared to a gate driver that uses two clock signals.

Each of the plurality of stages ST may be connected to a gate line in a corresponding row and configured to supply a gate signal to the gate line in the corresponding row. Each of the plurality of stages ST may be configured to output an output signal OUT in response to a start signal STV or a carry signal CR (CR[1], CR[n], . . . , CR[n+3]). An output signal OUT output from each of the stages ST may be a gate control signal configured to control turn-on and turn-off of an N-type transistor. As an example, an output signal OUT output from each of the stages ST may be a second gate signal GC (see FIG. 2) applied to the second gate control line GCL2 or a third gate signal GI (see FIG. 2) applied to the third gate control line GCL3. Hereinafter, an on-voltage may be a high-level voltage (a high voltage), and an off-voltage may denote a low-level voltage (a low voltage).

Each of the plurality of stages ST may include an input terminal In, a first clock terminal CK1, a second clock terminal CK2, a voltage input terminal VT, and an output terminal Out.

The input terminal In may be configured to receive, as a start signal, an external signal STV or a carry signal CR. In an embodiment, an external signal STV may be applied to the input terminal In of a first stage ST1, and a carry signal CR output from a previous stage may be applied to an input terminal In of subsequent stage. For example, a carry signal CR[1] output from a first stage ST1 may be applied to an input terminal In of the second stage. For example, a carry signal CR[n+2] output from a $(n+2)^{th}$ stage STn+2 may be applied to an input terminal In of the $(n+3)^{th}$ stage STn+3. A carry signal may be an output signal of a stage right before a current stage. As an example, an $(n)^{st}$ output signal OUT[n] output from an $n^{th}$ stage STn may be applied to an input terminal In of an $(n+1)^{st}$ stage STn+1.

One of the first to fourth clock signals CLK1, CLK2, CLK3, and CLK4 may be applied to the first clock terminal CK1 and the second clock terminal CK2. The first to fourth clock signals CLK1, CLK2, CLK3, and CLK4 may be square wave signals in which a high voltage and a low voltage are repeated. In an embodiment, the first to fourth clock signals CLK1, CLK2, CLK3, and CLK4 may be square wave signals in which a first voltage VGH of a first voltage level and a second voltage VGL of a second voltage level are repeated. Hereinafter, the first voltage VGH is referred to as a high-level voltage (a high voltage), and the second voltage VGL is referred to as a low-level voltage (a low voltage). The frequency of the first to fourth clock signals CLK1, CLK2, CLK3, and CLK4 may be one fourth of the frequency of the horizontal synchronization signal Hsync. A high-voltage period of the first to fourth clock signals CLK1, CLK2, CLK3, and CLK4 may be set greater than a low-voltage period. In an embodiment, a high-voltage period may be an on-voltage period, and a low-voltage period may be an off-voltage period. The four signals including the first to fourth clock signals CLK1, CLK2, CLK3, and CLK4 may have the same period and be phase-shifted signals. The first to fourth clock signals CLK1, CLK2, CLK3, and CLK4 may be sequentially shifted in their phases such that high-voltage periods partially overlap each other, and applied to the gate driver 130. The first to fourth clock signals CLK1, CLK2, CLK3, and CLK4 are sequentially shifted in their phases by about 90° and applied to the gate driver 130.

Different clock signals may be respectively applied to the first clock terminal CK1 and the second clock terminal CK2. A pair of clock signals applied to the first clock terminal CK1 and the second clock terminal CK2 of each stage may have a phase difference of about 90°. As an example, a first clock signal CLK1 and a second clock signal CLK2 may be respectively applied to the first clock terminal CK1 and the second clock terminal CK2 of an $n^{th}$ stage STn, a second clock signal CLK2 and a third clock signal CLK3 may be respectively applied to the first clock terminal CK1 and the second clock terminal CK2 of an $(n+1)^{st}$ stage STn+1, a third clock signal CLK3 and a fourth clock signal CLK4 may be respectively applied to the first clock terminal CK1 and the second clock terminal CK2 of an $(n+2)^{nd}$ stage STn+2, and a fourth clock signal CLK4 and a first clock signal CLK1 may be respectively applied to the first clock terminal CK1 and the second clock terminal CK2 of an $(n+3)^{rd}$ stage STn+3. The order of a pair of two clock signals applied to a stage ST may be repeated in units of four stages ST. A pair of a first clock signal CLK1 and a second clock signal CLK2, and a pair of a third clock signal CLK3 and a fourth clock signal CLK4 may be applied in turn to the first clock terminal CK1 and the second clock terminal CK2 of odd-numbered stages. A pair of a second clock signal CLK2 and a third clock signal CLK3, and a pair of a fourth clock signal CLK4 and a first clock signal CLK1 may be applied in turn to the first clock terminal CK1 and the second clock terminal CK2 of even-numbered stages.

A second voltage VGL may be applied to the voltage input terminal VT. The second voltage VGL is a global signal and may be supplied from the controller 170 shown in FIG. 1 and/or a power supply portion (not shown) and the like.

An output signal may be output from the output terminal Out. An output signal may be a gate signal supplied to a pixel through a corresponding gate line (gate control line). An output signal is a carry signal and may be supplied to an input terminal In of a next stage.

Output signal OUT output from the stage ST may be synchronized with a clock signal applied to the first clock terminal CK1 and a period where an output signal OUT has a high voltage may coincide with a period where a clock signal applied to the first clock terminal CK1 has a high voltage. As an example, as shown in FIG. 4, an output signal OUT[n] output from an $n^{th}$ stage STn may be output in synchronization with a first clock signal CLK1, an output signal OUT[n+1] output from an $(n+1)^{st}$ stage STn+1 may be output in synchronization with a second clock signal CLK2, an output signal OUT[n+2] output from an $(n+2)^{nd}$ stage STn+2 may be output in synchronization with a third clock signal CLK3, and an output signal OUT[n+3] output from an $(n+3)^{rd}$ stage STn+3 may be output in synchronization with a fourth clock signal CLK4. High-voltage periods of adjacent output signals OUT may partially overlap each other.

Figure 5:
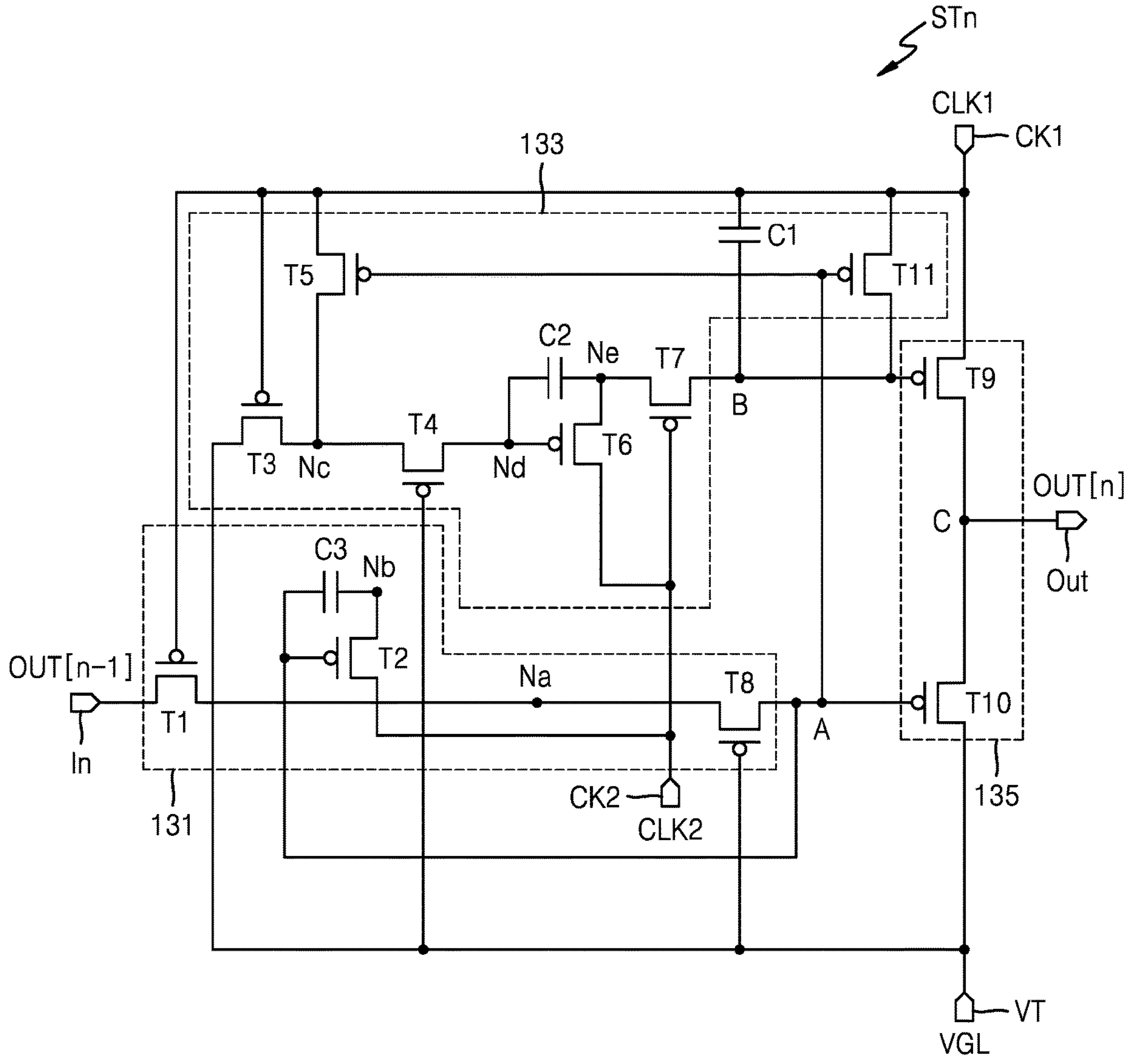
FIG. 5 is a circuit diagram of an example of a stage included in the gate driver of FIG. 3.
Figure 6:
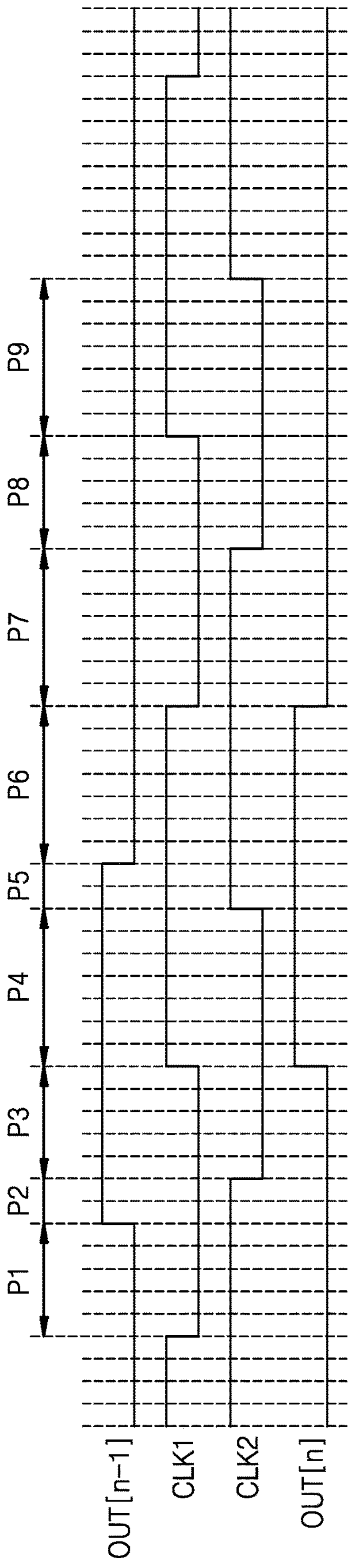
FIG. 6 is a timing diagram for explaining a method of driving the stage of FIG. 5.

FIG. 5 is a circuit diagram of an example of a stage included in the gate driver of FIG. 3. FIG. 6 is a timing diagram for explaining a method of driving the stage of FIG. 5.

Each of the stages ST includes a plurality of nodes. Hereinafter, some of the plurality of nodes are denoted by a first control node A, a second control node B, and an output node C. Hereinafter, an $n^{th}$ stage STn configured to output an $n^{th}$ output signal OUT[n] to an $n^{th}$ row of the pixel portion 110 is described as an example. In an embodiment, transistors included in the stages ST may be P-channel transistors.

The $n^{th}$ stage STn may include a first node controller 131, a second node controller 133, and an output unit 135. Hereinafter, for convenience of description, the case where the $n^{th}$ stage STn is an odd-numbered stage, a first clock signal CLK1 is applied to the first clock terminal CK1, and a second clock signal CLK2 is applied to the second clock terminal CK2 is described as an example.

The first node controller 131 may be connected between the input terminal In and the first control node A. The first node controller 131 may be configured to control the voltage of the first control node A in response to a start signal STV or a carry signal CR which is an output signal of a previous stage applied to an input terminal In according to a first clock signal CLK1 applied to the first clock terminal CK1. The first node controller 131 may include a first transistor T1 and an eighth transistor T8. The first node controller 131 may further include a second transistor T2 and a third capacitor C3.

The first transistor T1 may be connected between the input terminal In and a first node Na. A gate of the first transistor T1 may be connected to the first clock terminal CK1. When a first clock signal CLK1 applied to the first clock terminal CK1 is in a low voltage, the first transistor T1 may be turned on and configured to transfer an input signal applied to the input terminal In to the first node Na.

The eighth transistor T8 may be connected between the first node Na and the first control node A. A gate of the eighth transistor T8 may be connected to the voltage input terminal VT. The eighth transistor T8 maintains its turn-on state due to the second voltage VGL applied to the voltage input terminal VT and may connect the first node Na to the first control node A.

The second transistor T2 may be connected between the second clock terminal CK2 and a second node Nb. A gate of the second transistor T2 may be connected to the first control node A. The second transistor T2 may be a control transistor configured to control the voltage level of the first control node A. As an example, when the voltage of the first control node A is a low voltage, the second transistor T2 may be turned on, and when a second clock signal CLK2 transitions from a high voltage to a low voltage, the voltage level of the first control node A to which a third capacitor C3 is connected may be further lowered.

The third capacitor C3 may be connected between the first control node A and the second node Nb. When the voltage of the first control node A is a low voltage and a second clock signal CLK2 applied to the second clock terminal CK2 transitions from a high voltage to a low voltage, the second transistor T2 may be turned on and the third capacitor C3 may be configured to boost the voltage of the first control node A.

The second node controller 133 may be connected between the voltage input terminal VT and the second control node B. The second node controller 133 may be configured to control the voltage of the second control node B in response to a first clock signal CLK1 applied to the first clock terminal CK1, a second clock signal CLK2 applied to the second clock terminal CK2, and the second voltage VGL applied to the voltage input terminal VT. The second node controller 133 may include a third transistor T3, a fourth transistor T4, a sixth transistor T6, a seventh transistor T7, and an eleventh transistor T11. The second node controller 133 may further include the first capacitor C1 and the second capacitor C2. The second node controller 133 may further include a fifth transistor T5.

The third transistor T3 may be connected between the voltage input terminal VT and a third node Nc. A gate of the third transistor T3 may be connected to the first clock terminal CK1. When a first clock signal CLK1 applied to the first clock terminal CK1 is a low voltage, the third transistor T3 may be turned on and configured to transfer the second voltage VGL applied to the voltage input terminal VT to the third node Nc.

The fourth transistor T4 may be connected between the third node Nc and a fourth node Nd. A gate of the fourth transistor T4 may be connected to the voltage input terminal VT. The fourth transistor T4 maintains its turn-on state due to the second voltage VGL applied to the voltage input terminal VT and may connect the third node Nc to the fourth node Nd so that the third node Nc and the fourth node Nd are conductive.

The fifth transistor T5 may be connected between the first clock terminal CK1 and the third node Nc. A gate of the fifth transistor T5 may be connected to the first control node A. When the first control node A is in a low voltage, the fifth transistor T5 may be turned on and configured to transfer a first clock signal CKL1 applied to the first clock terminal CK1 to the third node Nc.

Because gates of the fifth transistor T5 and the eleventh transistor T11 are connected to the first control node A, when the first control node A is in a low voltage, the fifth transistor T5 and the eleventh transistor T11 may be turned on.

The fifth transistor T5 may be a short control transistor that prevents a short circuit between the first clock terminal CK1 and the second clock terminal CK2. With the fifth transistor T5 turned on, when a first clock signal CLK1 having a high voltage and a second clock signal CLK2 having a low voltage are supplied, the seventh transistor T7 may be turned on in response to a second clock signal CLK2, and a high voltage of the first clock signal CLK1 may be supplied to the fourth node Nd through the fifth transistor T5 and the fourth transistor T4 that are turned on. Accordingly, the sixth transistor T6 may be turned off. In this case, a short circuit between the first clock terminal CK1 and the second clock terminal CK2 may be prevented through the eleventh transistor T11, the seventh transistor T7, and the sixth transistor T6.

The sixth transistor T6 may be connected between the second clock terminal CK2 and a fifth node Ne. A gate of the sixth transistor T6 may be connected to the fourth node Nd. When the voltage of the fourth node Nd is a low voltage, the sixth transistor T6 may be turned on and configured to transfer a second clock signal CKL2 applied to the second clock terminal CK2 to the fifth node Ne.

The seventh transistor T7 may be connected between the second control node B and the fifth node Ne. A gate of the seventh transistor T7 may be connected to the second clock terminal CK2. Because the second control node B is boosted by the second capacitor C2, the voltage level of the second control node B may be lowered when the seventh transistor T7 is turned on. The seventh transistor T7 may be a control transistor configured to control the boosting of the second control node B.

The eleventh transistor T11 may be connected between the first clock terminal CK1 and the second control node B. A gate of the eleventh transistor T11 may be connected to the first control node A. When the first control node A is in a low voltage, the eleventh transistor T11 may be turned on and configured to transfer a first clock signal CKL1 applied to the first clock terminal CK1 to the second control node B. The eleventh transistor T11 may be a control transistor configured to control turn-off of the ninth transistor T9. As an example, when the voltage of the first control node A is a low voltage, the eleventh transistor T11 may be turned on to connect the first clock terminal CK1 and the gate of the ninth transistor T9. When the eleventh transistor T11 is turned on, a gate-source voltage of the ninth transistor T9 becomes zero, and thus, the ninth transistor T9 may be turned off.

The first capacitor C1 may be connected between the first clock terminal CK1 and the second control node B. The second capacitor C2 may be connected between the fourth node Nd and the fifth node Ne. When the first control node A is in a low voltage, the eleventh transistor T11 may be turned on. With the eleventh transistor T11 turned on, when a first clock signal CLK1 transitions from a high voltage to a low voltage and when a second clock signal CLK2 transitions from a high voltage to a low voltage, the voltage of the second control node B may be maintained by the first capacitor C1 and the second capacitor C2. Accordingly, the ninth transistor T9 may be configured to maintain a turn-off by the eleventh transistor T11 that is turned on.

The output unit 135 may be connected between the first clock terminal CK1 and the voltage input terminal VT. The output unit 135 may be configured to output an output signal of an on-voltage or an output signal of an off-voltage depending on the voltage level of the first control node A and the second control node B. The output unit 135 may include the ninth transistor T9 and a tenth transistor T10.

The ninth transistor T9 may be connected between the first clock terminal CK1 and the output node C. A gate of the ninth transistor T9 may be connected to the second control node B. The ninth transistor T9 may be a pull-up transistor configured to transfer a high voltage to the output node C. The ninth transistor T9 that is turned on may be configured to transfer a high voltage of a first clock signal CLK1 applied to the first clock terminal CK1 to the output node C.

The tenth transistor T10 may be connected between the output node C and the voltage input terminal VT. A gate of the tenth transistor T10 may be connected to the first control node A. The tenth transistor T10 may be a pull-down transistor configured to transfer a low voltage to the output node C. When the first control node A is in a low voltage, the tenth transistor T10 may be turned on to transfer the second voltage VGL of a low voltage applied to the voltage input terminal VT to the output node C.

Referring to FIG. 6, a previous output signal OUT[n−1] as a start signal, a first clock signal CLK1, a second clock signal CLK2, and an output signal OUT[n] are shown.

During a first period P1, a previous output signal OUT[n−1] may be supplied as a low voltage, and a first clock signal CLK1 may be supplied as a low voltage. A second clock signal CLK2 may be supplied as a high voltage.

During the first period P1, the first transistor T1 having the gate connected to the first clock terminal CK1 is turned on, and a low voltage of the previous output signal OUT[n−1] may be supplied to the first control node A through the eighth transistor T8 whose gate is connected to the voltage input terminal VT and turned on. Accordingly, during the first period P1, the tenth transistor T10, the eleventh transistor T11, and the fifth transistor T5 whose gates are connected to the first control node A may be turned on. Though a low voltage of a first clock signal CLK1 is supplied to the gate of the ninth transistor T9 by the eleventh transistor T11 that is turned on, the ninth transistor T9 may be turned off by connection of the gate and the source of the ninth transistor T9. In this case, the second transistor T2 having a gate connected to the first control node A may be turned on, and a high voltage of the second clock terminal CK2 may be applied to one end of the third capacitor C3. In addition, an output signal OUT[n] of a low voltage may be output from the output terminal Out connected to the output node C through the tenth transistor T10 that is turned on.

The third transistor T3 having a gate connected to the first clock terminal CK1 may be turned on, the fourth transistor T4 having a gate connected to the voltage input terminal VT may be turned on, and the second voltage VGL may be supplied to the fourth node Nd. The sixth transistor T6 having a gate connected to the fourth node Nd may be turned on. The seventh transistor T7 having a gate connected to the second clock terminal CK2 may be turned off during the first period P1.

During a second period P2 and a third period P3, a previous output signal OUT[n−1] may be supplied as a high voltage, and the first clock signal CLK1 may be supplied as a low voltage. A second clock signal CLK2 may be supplied as a high voltage during the second period P2 and supplied as a low voltage during the third period P3.

During the second period P2 and the third period P3, the first transistor T1 may be turned on in response to a first clock signal CLK1 of a low voltage, and a high voltage of the previous output signal OUT[n−1] may be supplied to the first control node A through the eighth transistor T8 that is turned on. Accordingly, the second transistor T2, the tenth transistor T10, the eleventh transistor T11, and the fifth transistor T5 each having the gate connected to the first control node A may be turned off.

The third transistor T3 may be turned on in response to a first clock signal CLK1 of a low voltage, and the second voltage VGL may be supplied to the fourth node Nd through the third transistor T3 and the fourth transistor T4 that are turned on. The sixth transistor T6 having the gate connected to the fourth node Nd may be turned on. The seventh transistor T7 may be turned off in response to a second clock signal CLK2 of a high voltage during the second period P2, the second control node B may be configured to maintain a low voltage of the previous period due to the first capacitor C1, and thus, the ninth transistor T9 may be turned on and a low voltage of a first clock signal CLK1 may be supplied to the output node C. In addition, the seventh transistor T7 may be turned on in response to a second clock signal CLK2 of a low voltage during the third period P3, and a low voltage of a second clock signal CLK2 may be supplied to the second control node B through the sixth transistor T6 and the seventh transistor T7 that are turned on. Accordingly, the ninth transistor T9 may be turned on during the third period P3, and a low voltage of a first clock signal CLK1 may be supplied to the output node C. Accordingly, during the second period P2 and the third period P3, an output signal OUT[n] of a low voltage may be output from the output terminal Out connected to the output node C.

During a fourth period P4 and a fifth period P5, a previous output signal OUT[n−1] may be supplied as a high voltage, and the first clock signal CLK1 may be supplied as a high voltage. A second clock signal CLK2 may be supplied as a low voltage during the fourth period P4 and supplied as a high voltage during the fifth period P5.

During the fourth period P4 and the fifth period P5, the first transistor T1 may be turned off in response to a first clock signal CLK1, the eighth transistor T8 may be configured to maintain turn-on, and the first control node A may be configured to maintain a high voltage of the previous period. Accordingly, during the fourth period P4 and the fifth period P5, the tenth transistor T10, the eleventh transistor T11, and the fifth transistor T5 may be turned off.

The third transistor T3 may be turned off in response to a first clock signal CLK1, and the fourth transistor T4 and the sixth transistor T6 may be configured to maintain turn on. During the fourth period P4, a second clock signal CLK2 of a low voltage may be supplied to the second control node B through the sixth transistor T6 that is turned on and the seventh transistor T7 that is turned on in response to a second clock signal CLK2 of a low voltage. Accordingly, the ninth transistor T9 may be turned on, and a high voltage of a first clock signal CLK1 may be supplied to the output node C. In addition, because the seventh transistor T7 is turned off and the second control node B is configured to maintain a low voltage during the fifth period P5, a high voltage of a first clock signal CLK1 may be supplied to the output node C through the ninth transistor T9 that is turned on during the fifth period P5.

Accordingly, during the fourth period P4 and the fifth period P5, an output signal OUT[n] of a high voltage may be output from the output terminal Out connected to the output node C.

During a sixth period P6, a previous output signal OUT[n−1] may be supplied as a low voltage, and a first clock signal CLK1 and a second clock signal CLK2 may be supplied as high voltages. During the sixth period P6, the first control node A may be configured to maintain a high voltage of the previous period, and the second control node B may be configured to maintain a low voltage of the previous period. Accordingly, during the sixth period P6, an output signal OUT[n] of a high voltage may be output from the output terminal Out connected to the output node C through the ninth transistor T9 that is turned on.

An output signal OUT[n] of a high voltage may be output in synchronization with a first clock signal CLK1 of a high voltage through the ninth transistor T9 that is turned on during the fourth to sixth periods P4, P5, and P6.

During a seventh period P7, a previous output signal OUT[n−1] may be supplied as a low voltage, a first clock signal CLK1 may be supplied as a low voltage, and a second clock signal CLK2 may be supplied as a high voltage.

During the seventh period P7, the first transistor T1 may be turned on in response to a first clock signal CLK1, and a low voltage of the previous output signal OUT[n−1] may be supplied to the first control node A through the first transistor T1 and the eighth transistor T8 that are turned on. Accordingly, during the seventh period P7, the tenth transistor T10, the eleventh transistor T11, and the fifth transistor T5 may be turned on. Though a low voltage of a first clock signal CLK1 is supplied to the gate of the ninth transistor T9 by the eleventh transistor T11 that is turned on, the ninth transistor T9 may be turned off by connection between the gate and the source of the ninth transistor T9. Accordingly, during the seventh period P7, an output signal OUT[n] of a low voltage may be output from the output terminal Out connected to the output node C through the tenth transistor T10 that is turned on.

Because the first control node A is in a low voltage, the second transistor T2 may be turned on, and the third capacitor C3 may have a voltage between a low voltage of the first control node A and a high voltage of a second clock signal CLK2. In addition, the third transistor T3 having the gate connected to the first clock terminal CK1 may be turned on, and the second voltage VGL may be supplied to the fourth node Nd through the third transistor T3 and the fourth transistor T4 that are turned on. The sixth transistor T6 having a gate connected to the fourth node Nd may be turned on, and the seventh transistor T7 may be turned off in response to a second clock signal CLK2.

During an eighth period P8, a previous output signal OUT[n−1] may be supplied as a low voltage, a first clock signal CLK1 may be supplied as a low voltage, and a second clock signal CLK2 may be supplied as a low voltage.

During the eighth period P8, the first transistor T1 may be turned on in response to a first clock signal CLK1, and a low voltage of the previous output signal OUT[n−1] may be supplied to the first control node A through the eighth transistor T8 that is turned on. Accordingly, during the eighth period P8, the tenth transistor T10, the eleventh transistor T11, and the fifth transistor T5 may be turned on. An output signal OUT[n] of a low voltage may be output from the output terminal Out connected to the output node C by the tenth transistor T10 that is turned on.

The third transistor T3 may be turned on in response to a first clock signal CLK1 of a low voltage, and a low voltage may be supplied to the third node Nc through the third transistor T3 that is turned on and the fifth transistor T5 that is turned on. The sixth transistor T6 may be turned on by a low voltage supplied through the third transistor T3 and the fourth transistor T4 that are turned on, and the seventh transistor T7 may be turned on in response to a second clock signal CLK2 of a low voltage. Though a low voltage is supplied to the gate of the ninth transistor T9 through the eleventh transistor T11 and the seventh transistor T7 that are turned on, the ninth transistor T9 may be turned off because a voltage difference between the gate and the source of the ninth transistor T9 is greater than the threshold voltage Vth of the ninth transistor T9.

During a ninth period P9, a previous output signal OUT[n−1] may be supplied as a low voltage, a first clock signal CLK1 may be supplied as a high voltage, and a second clock signal CLK2 may be supplied as a low voltage.

During the ninth period P9, the first transistor T1 may be turned off in response to a first clock signal CLK1 of a high voltage, and the first control node A may be configured to maintain a low voltage of the previous period. Accordingly, the tenth transistor T10, the eleventh transistor T11, and the fifth transistor T5 may be turned on. Because a high voltage is supplied to the gate of the ninth transistor T9 by the eleventh transistor T11 that is turned on, the ninth transistor T9 may be turned off because a voltage difference Vgs between the gate and the source of the ninth transistor T9 is greater than the threshold voltage Vth of the ninth transistor T9. In addition, an output signal OUT[n] of a low voltage may be output from the output terminal Out connected to the output node C by the tenth transistor T10 that is turned on.

The third transistor T3 may be turned off in response to a first clock signal CLK1 of a high voltage, the sixth transistor T6 may be turned off by the fourth transistor T4 that is turned on and the fifth transistor T5 that is turned on, and the seventh transistor T7 may be turned on in response to a second clock signal CLK2 of a low voltage. In this case, because the sixth transistor T6 is turned off, a short circuit between the first clock terminal CK1 and the second clock terminal CK2 may be prevented through the eleventh transistor T11, the seventh transistor T7, and the sixth transistor T6.

Figure 7:
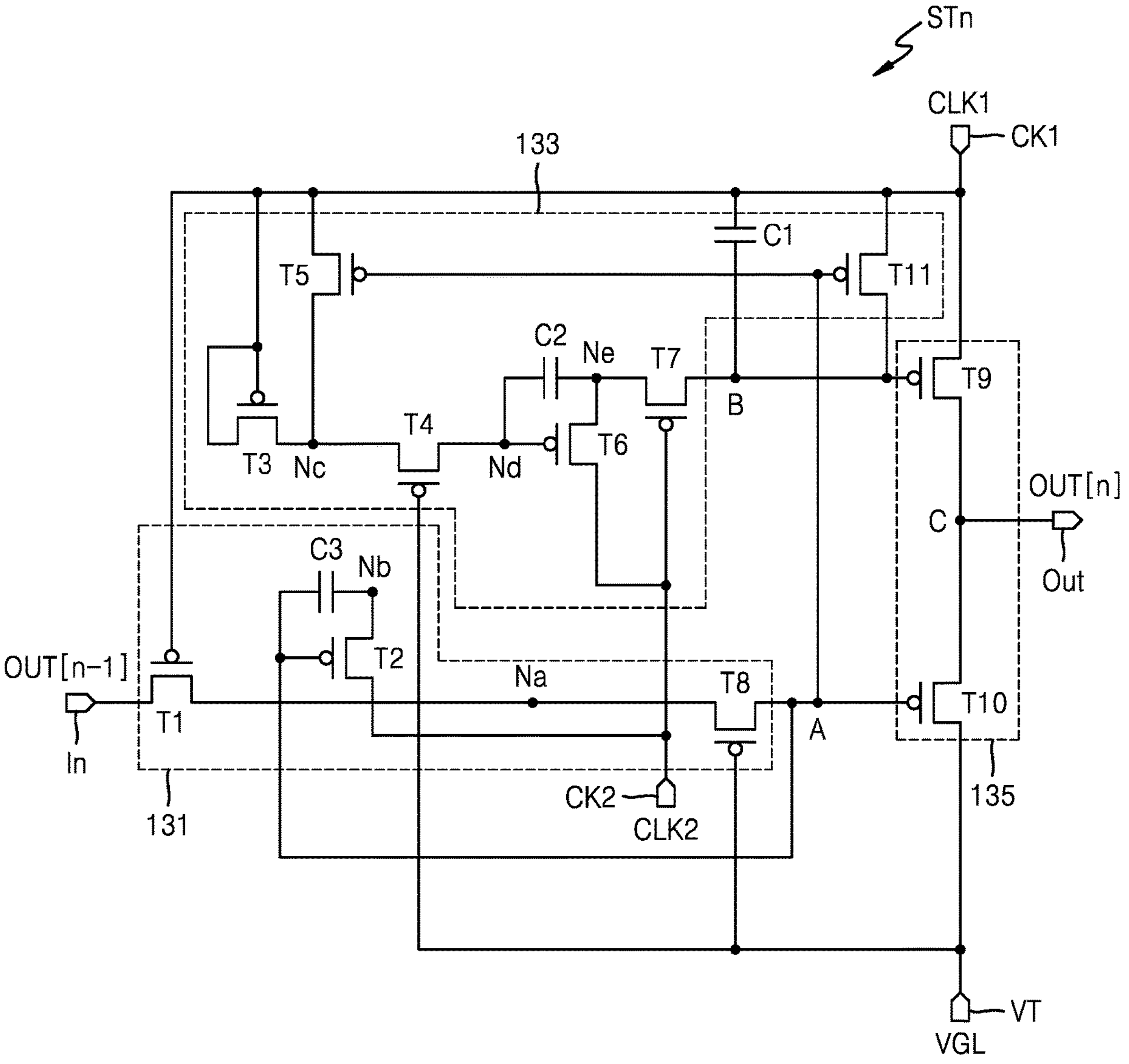
FIGS. 7, 8 and 9 are circuit diagrams showing various modified examples of a stage of a gate driver according to an embodiment.
Figure 8:
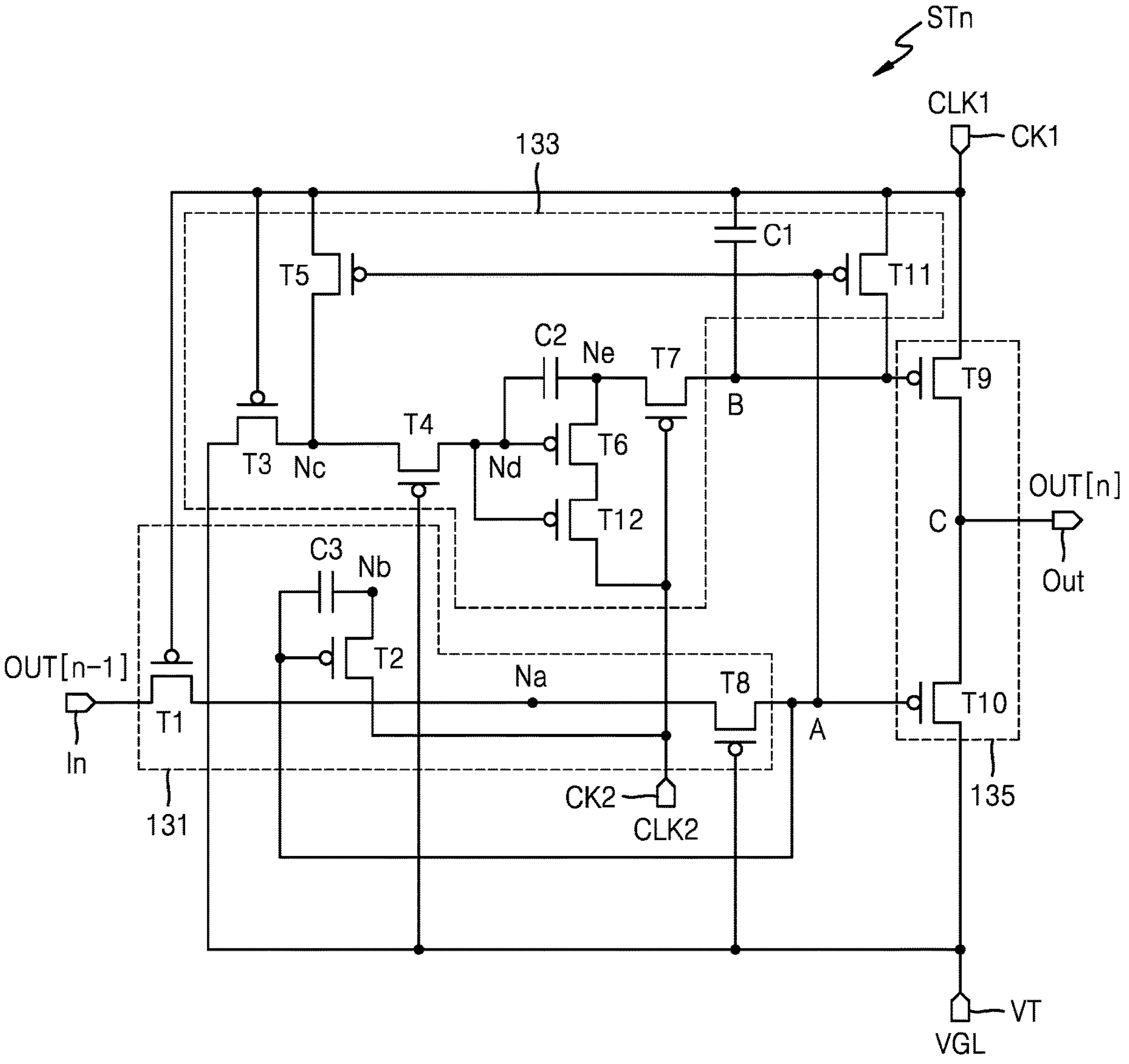
Figure 9:
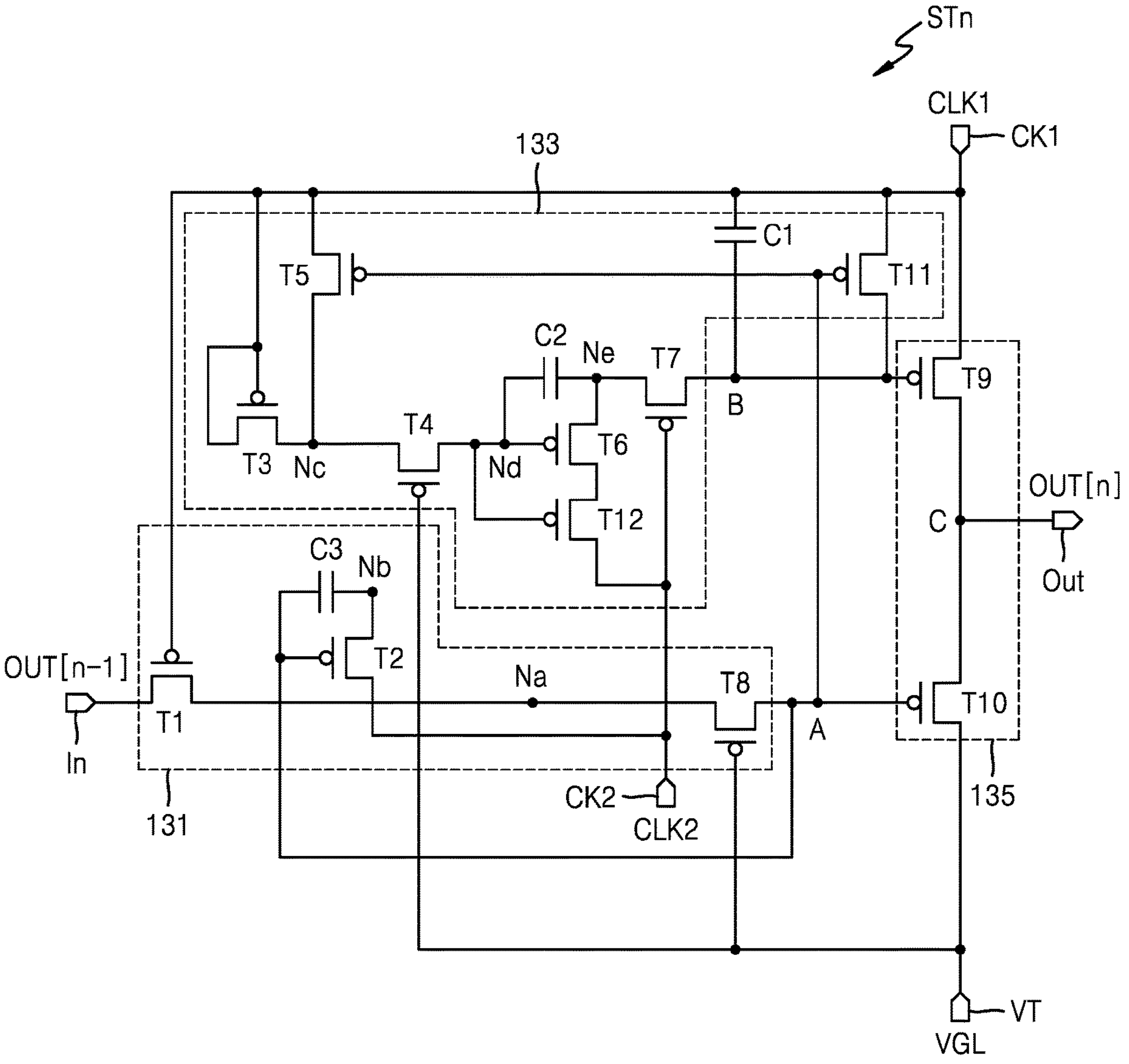

FIGS. 7 to 9 are circuit diagrams showing various modified examples of a stage of a gate driver according to an embodiment.

The stage STn shown in FIG. 7 is different from the stage STn shown in FIG. 5 in that the second terminal of the third transistor T3 is connected to the gate of the third transistor T3, and the other construction and operation are the same as the construction and operation shown in FIG. 5. The third transistor T3 may be turned on when a first clock signal CLK1 of a low voltage is applied thereto and configured to transfer the low voltage of the first clock signal CLK1 to the third node Nc.

The stage STn shown in FIG. 8 is different from the stage STn shown in FIG. 5 in that a twelfth transistor T12 is added, and the other construction and operation are the same as the construction and operation shown in FIG. 5. The twelfth transistor T12 may be connected between the sixth transistor T6 and the second clock terminal CK2. A gate of the twelfth transistor T12 may be connected to the fourth node Nd. When the fourth node Nd is in a low voltage, the sixth transistor T6 and the twelfth transistor T12 may be turned on to transfer the voltage of a second clock signal CLK2 to the fifth node Ne. Because the sixth transistor T6 and the twelfth transistor T12 are connected in series between the fifth node Ne and the second clock terminal CK2, a leakage current may be reduced when the sixth transistor T6 and the twelfth transistor T12 are turned off.

The stage STn shown in FIG. 9 is different from the stage STn shown in FIG. 5 in that the second terminal of the third transistor T3 is connected to the gate of the third transistor T3 and the twelfth transistor T12 is added, and the other construction and operation are the same as the construction and operation shown in FIG. 5. The third transistor T3 and the twelfth transistor T12 are respectively described with reference to FIGS. 7 and 8, descriptions thereof are omitted.

Though the above embodiments are described using the organic light-emitting display apparatus as an example, the display apparatus according to an embodiment is not limited thereto. In another embodiment, the display apparatus according to an embodiment may be an inorganic light-emitting display apparatus or a quantum-dot light-emitting display apparatus.

According to an embodiment, a gate driver configured to stably output gate signals and a display apparatus including the gate driver may be provided. Effects of the disclosure are not limited to the above effects but may variously extend without departing from the scope of the disclosure.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A gate driver including a plurality of stages, wherein each of the plurality of stages comprises:
- an output unit including a pull-up transistor and a pull-down transistor, the pull-up transistor being connected between a first clock terminal and an output terminal, and the pull-down transistor being connected between the output terminal and a voltage input terminal;
- a first node controller configured to control a voltage level of a first control node to which a gate of the pull-down transistor is connected; and
- a second node controller configured to control a voltage level of a second control node to which a gate of the pull-up transistor is connected,
- wherein the second node controller comprises:
- a first control transistor connected between the first clock terminal and the second control node, and including a gate connected to the first control node; and
- a second control transistor including a gate connected to the gate of the first control transistor and configured to control a short circuit between the first clock terminal and a second clock terminal.

2. The gate driver of claim 1, wherein the first node controller comprises:
- a first transistor connected between a first node and an input terminal to which a start signal is applied, the first transistor including a gate connected to the first clock terminal; and
- a second transistor connected between the first node and the first control node, and including a gate connected to the voltage input terminal.

3. The gate driver of claim 2, wherein the first node controller further includes:
- a third transistor connected between a second node and the second clock terminal, and including a gate connected to the first control node; and
- a first capacitor connected between the first control node and the second node.

4. The gate driver of claim 2, wherein the start signal is an output signal output from an output terminal of a previous stage.

5. The gate driver of claim 1, wherein a first clock signal applied to the first clock terminal and a second clock signal applied to the second clock terminal have a phase difference.

6. The gate driver of claim 1, wherein the second node controller further includes:
- a fourth transistor connected between a third node and the voltage input terminal, and including a gate connected to the first clock terminal;
- a fifth transistor connected between the third node and a fourth node, and including a gate connected to the voltage input terminal;
- a sixth transistor connected between a fifth node and the second clock terminal, and including a gate connected to the fourth node; and
- a seventh transistor connected between the fifth node and the second control node, and including a gate connected to the second clock terminal,
- wherein the second control transistor is connected between the first clock terminal and the third node.

7. The gate driver of claim 6, wherein the second node controller further includes:
- a second capacitor connected between the first clock terminal and the second control node; and
- a third capacitor connected between the fourth node and the fifth node.

8. The gate driver of claim 7, wherein the second node controller further includes a ninth transistor connected between the sixth transistor and the second clock terminal, and including a gate connected to the fourth node.

9. The gate driver of claim 1, wherein the second node controller further includes:
- a fourth transistor connected between a third node and the first clock terminal, and including a gate connected to the first clock terminal;
- a fifth transistor connected between the third node and a fourth node, and including a gate connected to the voltage input terminal;
- a sixth transistor connected between a fifth node and the second clock terminal, and including a gate connected to the fourth node; and
- a seventh transistor connected between the fifth node and the second control node, and including a gate connected to the second clock terminal,
- wherein the second control transistor is connected between the first clock terminal and the third node.

10. The gate driver of claim 9, wherein the second node controller further includes a ninth transistor connected between the sixth transistor and the second clock terminal, and including a gate connected to the fourth node.

11. The gate driver of claim 1, wherein four clock signals having a phase difference are sequentially applied to the gate driver,
- two clock signals among the four clock signals are supplied to each of the plurality of stages, and
- an input pair of the four clock signals is repeated every four stages.

12. A display apparatus comprising:
- a pixel portion in which a plurality of pixel are arranged; and
- a gate driver configured to output gate signals to the plurality of pixels,
- wherein the gate driver includes a plurality of stages, and each of the plurality of stages includes:
- an output unit including a pull-up transistor and a pull-down transistor, the pull-up transistor being connected between a first clock terminal and an output terminal configured to output the gate signal, and the pull-down transistor being connected between the output terminal and a voltage input terminal;
- a first node controller configured to control a voltage level of a first control node to which a gate of the pull-down transistor is connected; and a second node controller configured to control a voltage level of a second control node to which a gate of the pull-up transistor is connected, wherein the second node controller includes:

a first control transistor connected between the first clock terminal and the second control node, and including a gate connected to the first control node; and a second control transistor including a gate connected to the gate of the first control transistor and configured to control a short circuit between the first clock terminal and a second clock terminal.

13. The display apparatus of claim 12, wherein the first node controller includes:

a first transistor connected between an input terminal to which a start signal is applied and a first node, the first transistor including a gate connected to the first clock terminal;

a second transistor connected between the first node and the first control node, and including a gate connected to the voltage input terminal;

a third transistor connected between a second node and the second clock terminal, and including a gate connected to the first control node; and a first capacitor connected between the first control node and the second node.

14. The display apparatus of claim 13, wherein the start signal is an output signal output from an output terminal of a previous stage.

15. The display apparatus of claim 12, wherein a first clock signal applied to the first clock terminal and a second clock signal applied to the second clock terminal have a phase difference.

16. The display apparatus of claim 12, wherein the second node controller further includes:

a fourth transistor connected between a third node and the voltage input terminal, and including a gate connected to the first clock terminal;

a fifth transistor connected between the third node and a fourth node, and including a gate connected to the voltage input terminal;

a sixth transistor connected between a fifth node and the second clock terminal, and including a gate connected to the fourth node;

a seventh transistor connected between the fifth node and the second control node, and including a gate connected to the second clock terminal;

a second capacitor connected between the first clock terminal and the second control node; and a third capacitor connected between the fourth node and the fifth node, wherein the second control transistor is connected between the first clock terminal and the third node.

17. The display apparatus of claim 16, wherein the second node controller further includes a ninth transistor connected between the sixth transistor and the second clock terminal, and including a gate connected to the fourth node.

18. The display apparatus of claim 12, wherein the second node controller further includes:

a fourth transistor connected between a third node and the first clock terminal, and including a gate connected to the first clock terminal;

a fifth transistor connected between the third node and a fourth node, and including a gate connected to the voltage input terminal;

a sixth transistor connected between a fifth node and the second clock terminal, and including a gate connected to the fourth node;

a seventh transistor connected between the fifth node and the second control node, and including a gate connected to the second clock terminal;

a second capacitor connected between the first clock terminal and the second control node; and a third capacitor connected between the fourth node and the fifth node, wherein the second control transistor is connected between the first clock terminal and the third node.

19. The display apparatus of claim 18, wherein the second node controller further includes a ninth transistor connected between the sixth transistor and the second clock terminal, and including a gate connected to the fourth node.

20. The display apparatus of claim 12, wherein four clock signals having a phase difference are sequentially applied to the gate driver, two clock signals among the four clock signals are supplied to each of the plurality of stages, and an input pair of the four clock signals is repeated every four stages.

* * * * *